Nov. 26, 1968    J. P. K. FONTAINE    3,413,015
DOLLY FOR TRACTOR-TRAILER ASSEMBLIES AND PROCESS OF USING SAME
Filed July 8, 1966    4 Sheets-Sheet 1
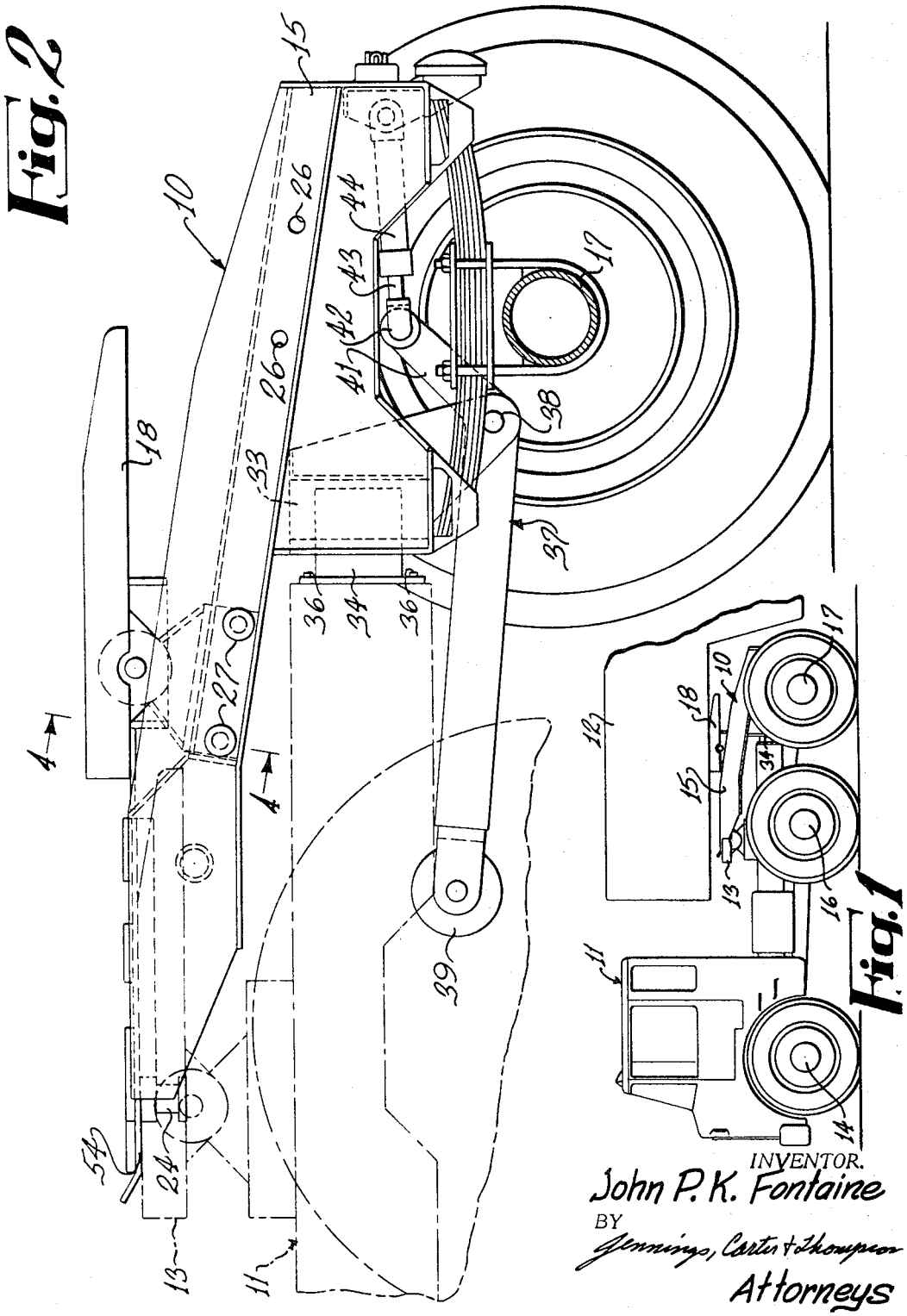
INVENTOR.
John P. K. Fontaine
BY
Jennings, Carter & Thompson
Attorneys

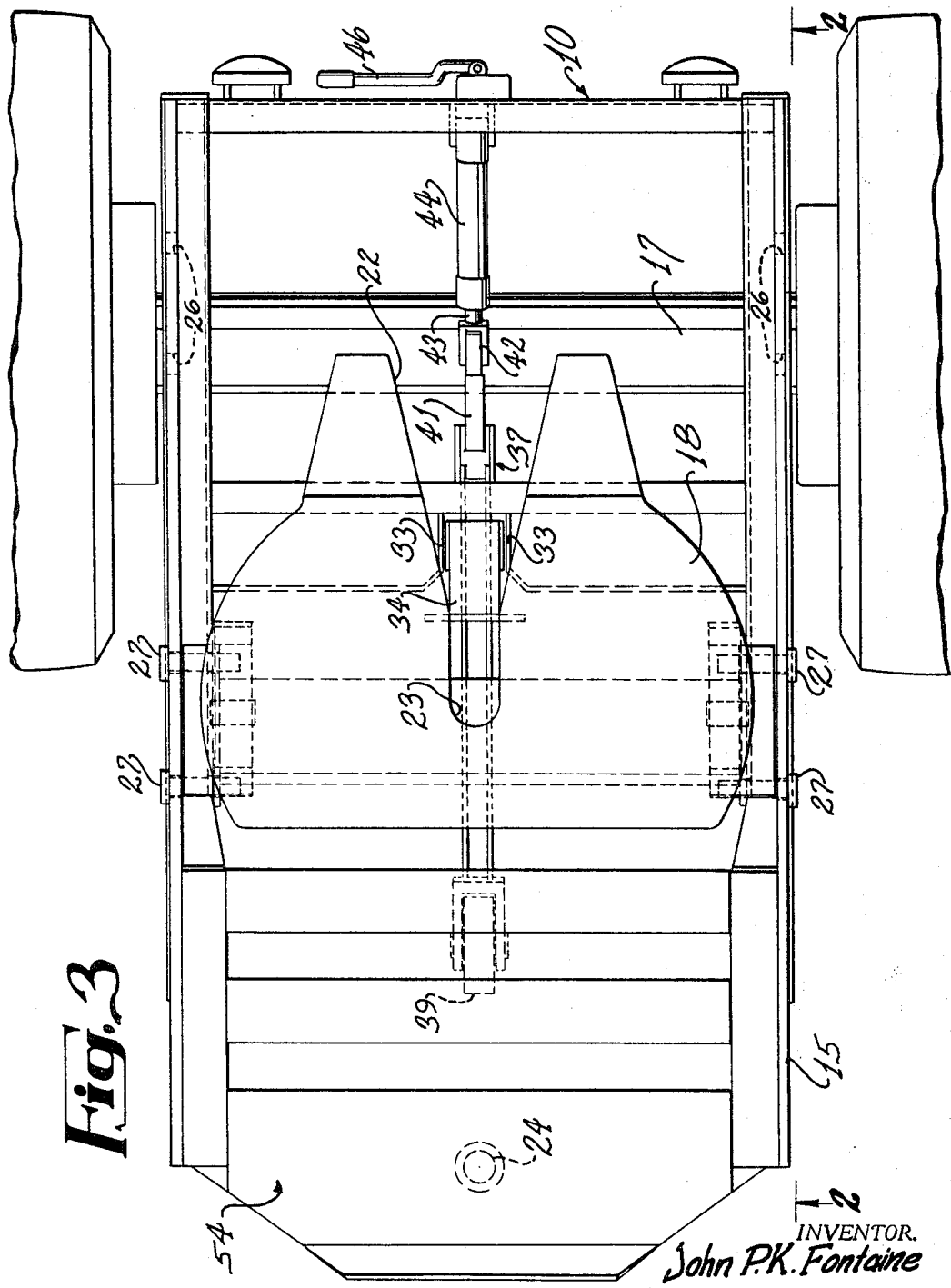

Nov. 26, 1968   J. P. K. FONTAINE   3,413,015
DOLLY FOR TRACTOR-TRAILER ASSEMBLIES AND PROCESS OF USING SAME
Filed July 8, 1966   4 Sheets-Sheet 3
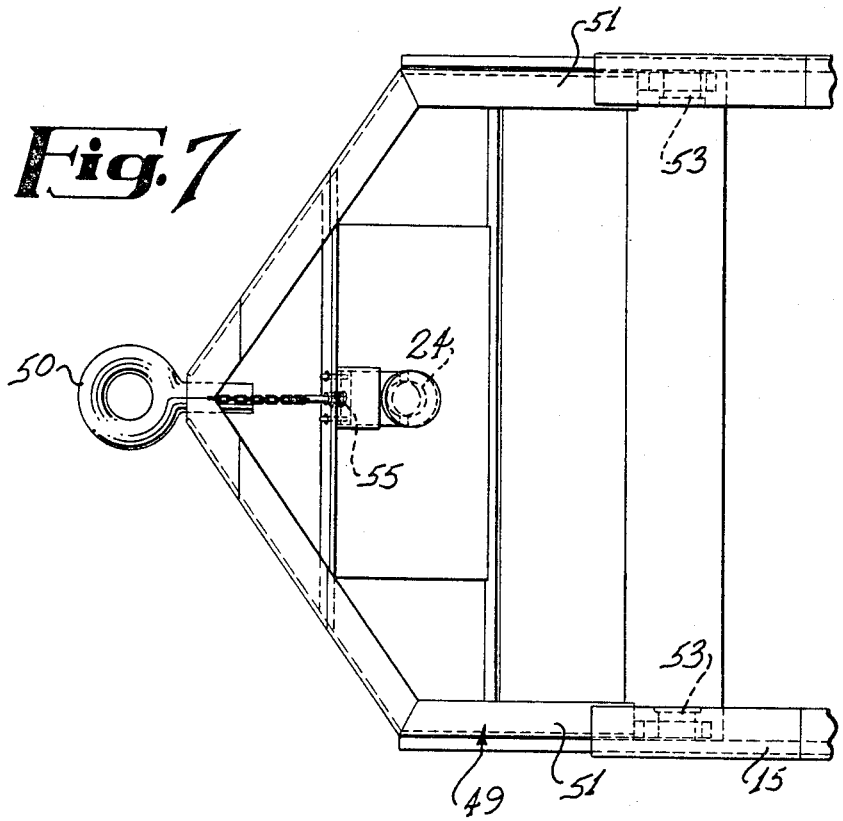
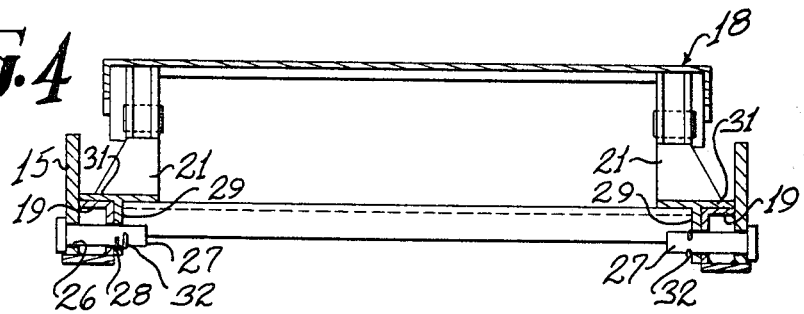
INVENTOR.
John P.K. Fontaine
BY
Jennings, Carter + Thompson
Attorneys

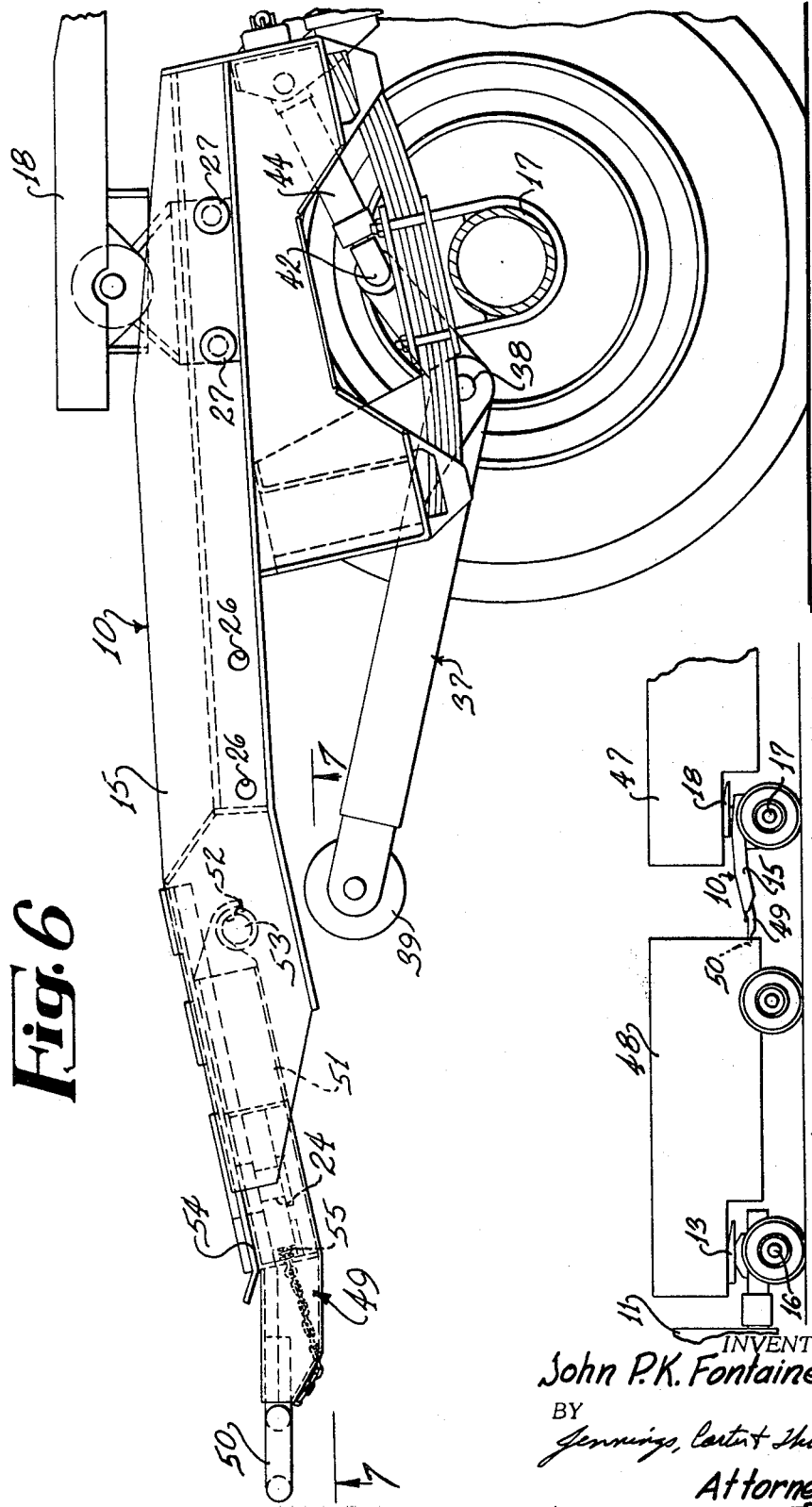

United States Patent Office 3,413,015
Patented Nov. 26, 1968

3,413,015
DOLLY FOR TRACTOR-TRAILER ASSEMBLIES
AND PROCESS OF USING SAME
John P. K. Fontaine, P.O. Box 1591,
Birmingham, Ala. 35201
Filed July 8, 1966, Ser. No. 563,842
3 Claims. (Cl. 280—415)

ABSTRACT OF THE DISCLOSURE

Process and apparatus for utilizing a dolly and the fifth wheel of a two axle tractor selectively as components of a three axle tractor to tow a single trailer or as components with a two axle tractor to tow trailers in tandem. The dolly has a longitudinally shiftable fifth wheel so that, as a single trailer, the fifth wheel of the tractor is connected directly to the dolly and as tandem tractors, the dolly is transferred between and connected to the trailers with the forwardmost trailer connected to the fifth wheel of the tractor.

---

This invention relates to a dolly for tractor-trailer assemblies and the process of using the same and more particularly to a dolly for converting a two axle tractor equipped with a fifth wheel for use selectively as a three axle tractor to tow a single trailer or as a two axle tractor to tow trailers in tandem.

An object of my invention is to provide a dolly and process of using the same of the character designated in which proper distribution of the load is maintained between the two rear axles of the tractor where the dolly is employed to convert a two axle tractor to a three axle tractor.

A further object of my invention is to provide a dolly and a process of using the same of the character designated which shall be easily and quickly converted to selected positions as a three axle tractor to tow a single trailer or as a two axle tractor to tow trailers in tandem.

A further object of my invention is to provide a dolly and process of using the same of the character designated which shall be extremely simple of construction, economical of manufacture and one which is adapted for use with a conventional type fifth wheel mounted on a two axle tractor.

Heretofore in the art to which my invention relates, the use of a dolly to convert a two-axle tractor to a three-axle tractor has required major modifications to the tractor and such apparatus has not afforded weight distribution between the two axles at the rear of the tractor when coupled. In accordance with my invention, no change is required from a conventional setting of the fifth wheel on the tractor.

Apparatus embodying features of my invention is illustrated in the accompanying drawings, forming a part of this application in which:

FIG. 1 is a side elevational view, partly broken away, showing the dolly employed to convert a two-axle tractor into a three axle tractor;

FIG. 2 is an enlarged, fragmental view taken generally along the line 2—2 of FIG. 3, the brake mechanism and other parts being omitted for the sake of clarity, and the tractor being indicated in dot dash lines;

FIG. 3 is a top plan view of the apparatus shown in FIG. 2, partly broken away;

FIG. 4 is a sectional view taken generally along the line 4—4 of FIG. 2;

FIG. 5 is a side elevational view, partly broken away, showing the dolly employed to tow trailers in tandem behind a two axle tractor;

FIG. 6 is an enlarged sectional view corresponding to FIG. 2 but showing the dolly adapted for use between tandem trailers; and, FIG. 7 is a fragmental view taken generally along the line 7—7 of FIG. 6.

Referring now to the drawings for a better understanding of my invention and more particularly to FIGURES 1 through 4, I show the dolly generally at 10 employed to convert a two axle tractor 11 into a three axle tractor for towing a single trailer indicated at 12. The tractor 11 is provided with a conventional fifth wheel assembly 13 and axles 14 and 16, as shown in FIG. 1.

The dolly 10 comprises a dolly frame 15 which is mounted on a supporting axle 17. A longitudinally shiftable fifth wheel assembly 18 is mounted on the dolly frame 15, as shown in FIGS. 2–4. Extending longitudinally along the inner sides of the dolly frame 15 are longitudinally extending support members 19 having flat upper surfaces, as shown in FIG. 4. Mounted for sliding movement along the support members 19 are support brackets 21 for the fifth wheel assembly 18. The fifth wheel assemblies 13 and 18 are of the conventional type with each having a rearwardly flaring opening 22 therein which terminates in a U-shaped slot 23 adapted to receive a king pin. The dolly frame 15 is provided with a depending king pin 24 adjacent the forward end thereof in position to engage the fifth wheel 13, as shown in FIG. 2.

To hold the fifth wheel assembly 18 in selected positions along the dolly frame 15, pairs of longitudinally spaced openings 26 are provided through the sides of the dolly frame in position to receive pins 27. Also, as shown in FIG. 4, openings 28 are provided through depending members 29 carried by the brackets 21 for receiving the pins 27. Preferably, each bracket 21 is of a generally T-shape, as viewed in cross section, to provide a horizontally extending member 31 which is adapted to engage the upper surface of the longitudinally extending members 19 and to provide the depending member 29 which extends alongside and inwardly of the elongated member 19. The pins 27 are held in place by suitable means, such as cotter pins 32.

Where the dolly is employed with a two axle tractor to convert the same into a three axle tractor, as shown in FIGS. 1, 2 and 3, the fifth wheel assembly 18 is moved to a forward position to distribute the load between the two rear axles of the tractor and to position the fifth wheel assembly 18 beneath the forward end of a single trailer. The fifth wheel 13 of the tractor 11 receives the king pin 24 of the dolly 10, as shown.

To limit lateral movement of the dolly 10 relative to the tractor 11, I provide laterally spaced, vertically extending guide members 33 which are in position to receive therebetween a rearwardly extending projection 34 carried by the tractor 11. That is, the dolly frame 15 is provided with a vertically extending recess between the vertical guide members 33 in position to receive the rearwardly extending projection 34, as shown in FIGS. 2 and 3. The rearwardly extending projection 34 is secured to the rear end of the tractor 11 by suitable retaining bolts 36. By providing the vertically extending guide members 33, the rearwardly extending projection 34 is adapted for free vertical movement relative to the dolly whereas lateral movement of the dolly relative to the projection 34 is limited.

To support the forward end of the dolly 10 for connecting the same to a tractor or to the rear end of a trailer, to be described hereinafter, I provide an adjustable support member 37 which is pivotally connected to the dolly frame 15 as at 38. The forward end of the support member 37 carries a suitable roller 39 which is adapted to move into engagement with a supporting surface to support the forward end of the dolly at an elevation above the supporting surface and in position to be connected selectively to a tractor or a trailer, as the case may be. The support member 37 is provided with an actuating arm 41 adjacent the rear end thereof which is pivotally connected as at 42 to the piston rod 43 of a fluid pressure operated cylinder 44. Fluid under pressure is introduced into the cylinder 44 by suitable means, such as by providing a pump and an operating handle 46 therefor.

To tow trailers in tandem, the fifth wheel assembly 18 is moved rearwardly on the dolly frame 15, as shown in FIGS. 5 and 6. The pins 27 lock the fifth wheel assembly 18 in this position whereby it is in position to move beneath the forward end of a rearmost trailer 47 to receive a conventional type king pin carried thereby. To attach the forward end of the dolly 10 to a forwardmost trailer 48 of the pair of tandem trailers, I provide a removable frame unit 49 having a lunette drawbar eye 50 at the forward end thereof. The lunette eye is operatively connected to the rear end of the forwardmost trailer 48, as shown in FIG. 5 in a manner well understood in the art. The removable frame 49 is provided with spaced apart, rearwardly extending members 51 having downwardly opening recesses 52 therein for receiving inwardly projecting pins 53 carried by the dolly frame 15 as shown in FIGS. 6 and 7. The forward end of the dolly frame 15 carries a king pin plate 54 in position to engage the upper surface of the removable frame 49 to limit upward movement thereof whereby the downwardly opening recesses 52 secure the removable frame 49 in place.

To keep the removable frame 49 in place adjacent the plate 54, I detachably connect the removable frame 49 to the king pin by a spring loaded plunger 55. The plunger is carried by the removable frame 49 in position to move into locking engagement with the king pin.

From the foregoing description, the operation of my improved apparatus and the manner in which my improved process is carried out will be readily understood. When towing a single trailer, the fifth wheel assembly 18 is moved to the forward position on the dolly frame 15 to distribute the load between the axles 16 and 17, as shown in FIG. 1, and is locked in place by the pins 27. The support member 37 is adjusted whereby the forward end of the dolly 10 is in position for the king pin 24 to engage the fifth wheel 13 of the tractor. The support member 37 is then retracted whereby the forward end of the dolly 10 is supported by and connected to the fifth wheel 13 of the tractor. With the dolly 10 thus connected to the tractor to provide a three axle tractor, the fifth wheel assembly 18 is connected to the forward end of a single trailer 12, as shown in FIG. 1. The vertical guide members 33 engage the rearwardly extending projection 34 carried by the tractor 11 to limit lateral movement of the dolly relative to the tractor.

When towing trailers in tandem, the dolly 10 is transferred from its coupled position with the fifth wheel 13 of the tractor to a position with the fifth wheel assembly 18 of the dolly being beneath and coupled to the front end of the rearmost trailer 47 of a pair of tandem trailers. The front end of the dolly 10 is then coupled by the lunette drawbar eye 50 to the rear end of the forwardmost trailer 48 while the forward end of the trailer 48 is connected to the fifth wheel 13 of the tractor 11, as shown in FIG. 5.

From the foregoing, it will be seen that I have devised an improved dolly and process of using the same whereby a two axle tractor equipped with a fifth wheel is adapted for use selectively as a three axle tractor to tow a single trailer or as a two axle tractor to tow trailers in tandem. By providing a dolly which may be employed at either of these positions, I greatly reduce the overall cost of the equipment and at the same time provide proper distribution of weight between the axles at the rear of the tractor where the two axle tractor is converted into a three axle tractor. Furthermore, I accomplish these improved results without modification of the tractor.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a dolly for converting a two axle tractor selectively as a three axle tractor to tow a single trailer or as a two axle tractor to tow trailers in tandem comprising:
    (a) a dolly frame,
    (b) a supporting axle carried by and extending transversely of said dolly frame,
    (c) a longitudinally shiftable fifth wheel mounted on said dolly frame,
    (d) means holding said longitudinally shiftable fifth wheel at selected positions longitudinally of said dolly frame for use selectively to support the forward end of a single trailer or the forward end of a rearmost trailer where tandem trailers are towed,
    (e) a first connector means adjacent the forward end of said dolly frame for connecting the dolly frame directly to the fifth wheel of a two axle tractor and converting it to a three axle tractor and providing weight distribution between the rear axles of the tractor when coupled where a single trailer is towed, and
    (f) a second connector means detachably connected to the forward end of said dolly frame for connecting the dolly frame to the rear end of a forwardmost trailer where tandem trailers are towed.

2. In a dolly as defined in claim 1 in which said first connector means adjacent the forward end of the dolly frame comprises a king pin to connect the dolly frame to the fifth wheel of a tractor and said second connector means comprises a lunette drawbar eye carried by a removable frame detachably connected to the forward end of the dolly to connect the dolly frame to the rear end of a forwardmost trailer where tandem trailers are towed.

3. In a dolly as defined in claim 2 in which inwardly extending projections are carried by opposite sides of the dolly frame and the removable frame extends inwardly of the dolly frame and downwardly opening recesses are provided in the removable frame in position to engage said projections to connect said removable frame to the dolly frame.

References Cited

UNITED STATES PATENTS

| 1,858,769 | 5/1932 | Erskine | 280—408 |
| 1,880,123 | 9/1932 | Davis et al. | 280—408 |
| 2,330,897 | 10/1943 | Kirksey | 280—432 |
| 2,697,614 | 12/1954 | Smith | 280—423 |
| 2,714,017 | 7/1955 | Mendez | 280—432 |
| 3,163,306 | 12/1964 | Bennett et al. | 280—423 X |
| 3,169,012 | 2/1965 | Fagan | 280—408 X |
| 3,246,912 | 4/1966 | Cunha | 280—407 |
| 3,312,479 | 4/1967 | Cunha | 280—407 |

FOREIGN PATENTS

| 954,262 | 4/1964 | Great Britain. |

LEO FRIAGLIA, *Primary Examiner.*